(12) United States Patent
Hashimura

(10) Patent No.: US 9,193,124 B2
(45) Date of Patent: Nov. 24, 2015

(54) METHOD OF MANUFACTURING PNEUMATIC TIRE

(75) Inventor: Yoshiaki Hashimura, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 1444 days.

(21) Appl. No.: 11/661,734

(22) PCT Filed: Sep. 13, 2005

(86) PCT No.: PCT/JP2005/016814
§ 371 (c)(1),
(2), (4) Date: Mar. 1, 2007

(87) PCT Pub. No.: WO2006/030766
PCT Pub. Date: Mar. 23, 2006

(65) Prior Publication Data
US 2008/0093012 A1    Apr. 24, 2008

(30) Foreign Application Priority Data

Sep. 15, 2004  (JP) ................................ 2004-268330

(51) Int. Cl.
*B29D 30/36* (2006.01)
*B29D 30/26* (2006.01)
*B29D 30/06* (2006.01)
*B60C 5/14* (2006.01)

(52) U.S. Cl.
CPC .............. *B29D 30/36* (2013.01); *B29D 30/26* (2013.01); *B29D 2030/0682* (2013.01); *B60C 5/14* (2013.01)

(58) Field of Classification Search
USPC .................. 156/123, 131, 133, 417; 152/510, 152/DIG. 16
See application file for complete search history.

(56) References Cited

U.S. PATENT DOCUMENTS

| | | | | |
|---|---|---|---|---|
| 4,928,741 A | * | 5/1990 | Rye et al. ....................... | 152/504 |
| 5,851,323 A | * | 12/1998 | Kaido et al. ................... | 152/510 |
| 5,938,869 A | * | 8/1999 | Kaido et al. ................... | 152/510 |
| 6,079,465 A | * | 6/2000 | Takeyama et al. ............. | 152/510 |

(Continued)

FOREIGN PATENT DOCUMENTS

| | | |
|---|---|---|
| DE | 4030474 A1 * | 4/1991 |
| EP | 1435301 A1 * | 7/2004 |

(Continued)

OTHER PUBLICATIONS

Machine Translation for JP 2002-012002-A (published Jan. 15, 2002).*

(Continued)

*Primary Examiner* — Geoffrey L Knable
(74) *Attorney, Agent, or Firm* — Greer Burns & Crain, Ltd.

(57) ABSTRACT

Provided is a method of manufacturing a pneumatic tire, in which the uniformity of a tire can be improved. The method of manufacturing a pneumatic tire of the present invention is a method in which a green tire is deformed by a building drum in a tire building process. The building drum used for this process is expandable and contractable in the tire radial directions. In the method, a non-adhesive sheet is disposed on the innermost surface of the green tire. The non-adhesive sheet has a coefficient of friction of 0 to 0.2 on the building drum. Then, the green tire is built in a state where the non-adhesive sheet is attached thereto.

2 Claims, 1 Drawing Sheet

(56) References Cited

U.S. PATENT DOCUMENTS

| | | | | |
|---|---|---|---|---|
| 6,136,123 | A | * | 10/2000 | Kaido et al. ............... 156/123 |
| 6,758,930 | B1 | * | 7/2004 | Felten ....................... 156/111 |
| 2004/0089388 | A1 | * | 5/2004 | Fujino et al. .............. 152/510 |
| 2005/0098252 | A1 | * | 5/2005 | Muraoka et al. .......... 152/510 |
| 2006/0144495 | A1 | * | 7/2006 | Higuchi et al. ............ 152/510 |

FOREIGN PATENT DOCUMENTS

| | | | |
|---|---|---|---|
| JP | 11-10779 | | 1/1999 |
| JP | 2001-113611 | | 4/2001 |
| JP | 2001-219478 | | 8/2001 |
| JP | 2002-012002 A | * | 1/2002 |
| JP | 2002-103471 | | 4/2002 |
| JP | 2002-103476 | | 4/2002 |
| WO | WO-2005/007423 A1 | * | 1/2005 |

OTHER PUBLICATIONS

Machine Translation for DE-4030474-A1 (published Apr. 11, 1991).*

* cited by examiner

METHOD OF MANUFACTURING PNEUMATIC TIRE

TECHNICAL FIELD

The present invention relates to a method of manufacturing a pneumatic tire, in which a green tire is deformed by a building drum being expandable and contractable in radial directions of the tire, in a tire building process. Specifically, the present invention relates to a method of manufacturing a pneumatic tire, by which the uniformity of a tire can be improved.

BACKGROUND ART

In a process of building a pneumatic tire, a green tire is deformed by using a building drum. The building drum used for this process is provided with a plurality of segment plates, which are separated from one another in a circumferential direction of the tire. By radially expanding the building drum in the tire radial direction, the green tire formed by laminating uncured rubber members is deformed. In other words, by radially expanding the building drum in the tire radial direction, the green tire is lifted (refer to Patent Document 1, for example.)

However, if the coefficient of friction between the building drum and the green tire is high, the green tire does not smoothly slide on the building drum. Accordingly, the green tire is stretched locally in its portions near separating positions of the building drum. This results in a problem that the green tire is deformed non-uniformly in the circumferential direction thereof, and thereby the uniformity of the tire is deteriorated. Particularly, the existence of portions having a higher rigidity than others in the circumference of the tire makes the uniformity of the tire deteriorate pronouncedly. Such portions having a higher rigidity include splice portions where rubber members are overlapped and spliced.

[Patent Document 1] Japanese patent application Kokai publication No. 2001-113611

DISCLOSURE OF THE INVENTION

An object of the present invention is to provide a method of manufacturing a pneumatic tire, in which the uniformity of a tire can be improved.

The method of manufacturing a pneumatic tire of the present invention for achieving the above-described object is a method in which a green tire is deformed by a building drum in a tire building process. The building drum used for the process is expandable and contractable in the tire radial directions. The method is characterized in that a non-adhesive sheet is disposed on the innermost surface of the green tire. The non-adhesive sheet to be disposed has a coefficient of friction of 0 to 0.2 on the building drum. The method is also characterized in that the green tire is built in a state where the non-adhesive sheet is attached thereto.

In the present invention, the non-adhesive sheet having a low coefficient of friction on the building drum is disposed on the innermost surface of the green tire. Then, the green tire is deformed in a state where the non-adhesive sheet is attached to the innermost surface. Accordingly, when the green tire is deformed by the building drum being expandable and contractable in the tire radial directions, the green tire smoothly slides on the building drum. This makes the amount of deformation of the green tire in the circumferential direction thereof be uniform, and thereby the uniformity of the tire is improved. Especially, the uniformity of the tire is further improved by using, as a constituent material for the non-adhesive sheet, a material having a higher rigidity than rubber, in an uncured state.

In the present invention, it is preferable that the green tire include a rubber sheet serving as an inner liner arranged inside a carcass layer, on a side closer to the side of an internal cavity of the tire, and the non-adhesive sheet be attached to the rubber sheet. Accordingly, the non-adhesive sheet secures the uniformity of the tire while the inner liner made of rubber serves a function of preventing air permeation.

As a constituent material for the non-adhesive sheet, preferably used is a thermoplastic resin or a thermoplastic elastomeric composition containing a blend of a thermoplastic resin and an elastomer. By using such a material, a favorable coefficient of friction and an appropriate rigidity for improving the uniformity of the tire are achieved.

BRIEF DESCRIPTION OF THE DRAWINGS

FIG. 1(a) is a side view of the building drum which is radially contracted, and FIG. 1(b) is a side view of the building drum which is radially expanded.

BEST MODE FOR CARRYING OUT THE INVENTION

Figure 1A:
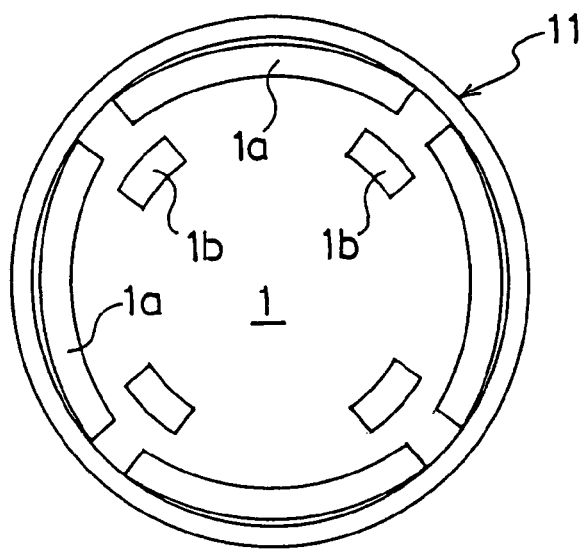
FIGS. 1(a) and 1(b) schematically show a building drum used for implementing a method of manufacturing a pneumatic tire according to an embodiment of the present invention.
Figure 1B:
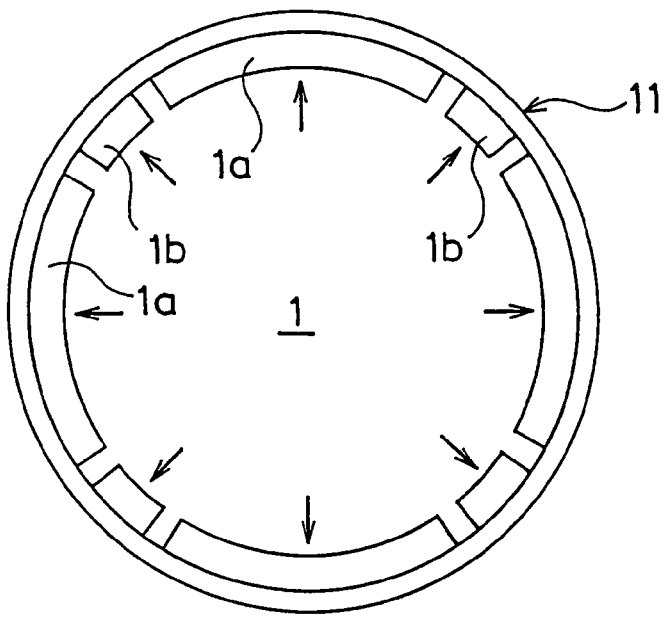

Descriptions will be provided in detail below of a configuration of the present invention by referring to the accompanying drawings. FIGS. 1(a) and 1(b) are views schematically showing a building drum used for implementing a method of manufacturing a pneumatic tire according to an embodiment of the present invention. FIG. 1(a) shows the state in which the building drum is radially contracted, and FIG. 1(b) shows the state in which the building drum is radially expanded.

As shown in FIGS. 1(a) and 1(b), a cylindrical building drum 1 is provided with segment plates 1a and 1b, which are separated from one another in a circumferential direction of a tire. These segment plates 1a and 1b are alternately disposed in the tire circumferential direction. Each of the segment plates 1a forms relatively large arc. On the other hand, each of the segment plates 1b forms relatively small arc. All the segment plates 1a and 1b are configured so as to expand and contract in radial directions of the tire. When the building drum 1 is radially contracted, the segment plates 1b move back further inwards than the segment plates 1a. When the building drum 1 is radially expanded, the segment plates 1a and 1b form a cylindrical shape together, and thereby a green tire 11 is stretched.

Figure 2:
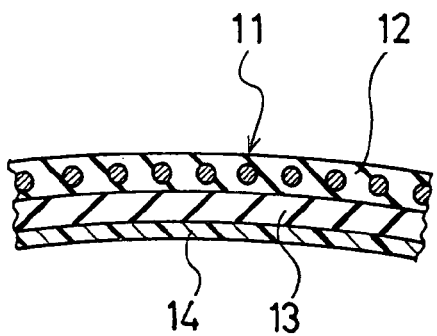
FIG. 2 is an enlarged cross section of a chief portion of a green tire in the method of manufacturing a pneumatic tire of the present invention.

FIG. 2 is an enlarged view showing a chief portion of the green tire in the method of manufacturing a pneumatic tire of the present invention. As shown in FIG. 2, the green tire 11 has a structure in which a carcass layer 12, a rubber sheet 13 and a non-adhesive sheet 14 are laminated. The carcass layer 12 is mounted on a pair of left and right bead portions. The rubber sheet 13 serves as an inner liner, and is located at the inner side of the carcass layer 12. The non-adhesive sheet 14 is located at the inner side of the rubber sheet 13. The non-adhesive sheet 14 is disposed on the innermost surface of the green tire 11. The non-adhesive sheet 14 may be disposed on the entirety of the innermost surface of the green tire 11. Alternatively, the non-adhesive sheet 14 may be disposed on at least a part thereof.

The rubber sheet 13 may be composed of a rubber having a low air permeability, such as isobutylene-isoprene rubber or natural rubber, which is conventionally used for an inner liner.

Meanwhile, the non-adhesive sheet 14 on the building drum 1 needs to have a coefficient of friction of 0 to 0.2. The coefficient of friction greater than 0.2 makes non-uniform the amount of deformation of the green tire 11 in the circumferential direction thereof. Moreover, it is more preferable that the coefficient of friction be 0 to 0.15. It should be noted that the coefficient of friction used here is measured in accordance with a testing method for coefficients of friction, which method is defined by JIS K 7125. To be specific, a non-adhesive sheet and the same conditions (such as a material and a surface roughness) as those of a surface of a building drum are prepared. Then, testing is performed using the method of the above-described regulation. According to a result of the measurement, a coefficient of static friction $\mu s$ is obtained.

Next, descriptions will be provided of the method of manufacturing a pneumatic tire of the present invention. It should be noted that a green tire is formed into a predetermined shape through a tire building process, and that the green tire is then cured by a curing machine to become a tire product. However, descriptions will be omitted here of the curing process.

First, as shown in FIG. 1(*a*), in the tire building process, the green tire 11 is disposed around the circumference of the building drum 1 which has been radially contracted. Subsequently, as shown in FIG. 1(*b*), all the segment plates 1*a* and 1*b* are moved outwards in the tire radial direction, so that the building drum 1 is radially expanded in the tire radial direction. Thereby, the green tire 11 is stretched in the circumferential direction thereof. At this time, as shown in FIG. 2, the non-adhesive sheet 14 has been disposed on the innermost surface of the green tire 11. Since the non-adhesive sheet 14 on the building drum 1 has a low coefficient of friction, the green tire 11 smoothly slides on the building drum 1. Accordingly, the amount of deformation of the green tire 11 in the circumferential direction thereof becomes uniform, and thereby the uniformity of the tire is improved.

As a constituent material for the non-adhesive sheet 14, one having a low coefficient of friction may be used. Especially preferable is a thermoplastic resin, or a thermoplastic elastomeric composition containing a blend of a thermoplastic resin and an elastomer. The thermoplastic elastomeric composition is obtained by dispersing an elastomer into a matrix of a thermoplastic resin.

As a thermoplastic resin, for example, polyamide resins (for example, Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/N66), Nylon 6/66/610 copolymer (N6/66/610), Nylon MXD6, Nylon 6T, Nylon 6/6T copolymer, Nylon 66/PP copolymer and Nylon 66/PPS copolymer), polyester resins (for example, aromatic polyesters including polybutylene terephthalate (PBT), polyethylene terephthalate (PET), polyethylene isophthalate (PEI), polybutylene terephthalate/tetramethylene glycol copolymer, PET/PEI copolymer, polyarylate (PAR), polybutylene naphthalate (PBN), liquid crystal polyesters, polyoxyalkylene diimide diacid/polybutylene terephthalate copolymer), polynitrile resins (for example, polyacrylonitrile (PAN), poly(meth)acrylonitrile, acrylonitrile/styrene copolymer (AS), methacrylonitrile/styrene copolymer, methacrylonitrile/styrene/butadiene copolymer), polymethacrylate resins (for example, polymethyl methacrylate (PMMA), polyethyl methacrylate, ethylene/ethyl acrylate copolymer (EEA), ethylene/acrylic acid copolymer (EAA), ethyl methacrylate resin (EMA)), polyvinyl resins (for example, ethylene-vinyl acetate (EVA), polyvinyl alcohol (PVA), ethylene/vinyl alcohol copolymer (EVOH), polyvinylidene chloride (PVDC), polyvinyl chloride (PVC), vinyl chloride/vinylidene chloride copolymer, vinylidene chloride/methyl acrylate copolymer), cellulose resins (for example, cellulose acetate, cellulose acetate butyrate), fluororesins (for example, polyvinylidene difluoride (PVDF), polyvinyl fluoride (PVF), Polychlorotrifluoroethylene (PCTFE), ethylene/tetrafluoroethylene copolymer (ETFE)), imide resins (for example, aromatic polyimide (PI)) may be cited.

As an elastomer, for example, diene rubber and the hydrogenated products thereof (for example, NR, IR, epoxidized natural rubber, SBR, BR (high cis BR and low cis BR), NBR, hydrogenated NBR, hydrogenated SBR), olefin rubber (for example, ethylene propylene rubber (EPDM, EPM), maleic acid modified ethylene propylene rubber (M-EPM)), isobutylene-isoprene rubber (IIR), isobutylene and aromatic vinyl or diene monomer copolymer, acrylic rubber (ACM), ionomer, halogenated rubber (for example, Br-IIR, Cl-IIR, brominated isobutylene para-methyl styrene copolymer (Br-IPMS), chloroprene rubber (CR), hydrin rubber (CHC, CHR), chlorosulfonated polyethylene (CSM), chlorinated polyethylene (CM), maleic acid modified chlorinated polyethylene (M-CM)), silicone rubber (for example, methyl vinyl silicone rubber, dimethyl silicone rubber, methylphenylvinyl silicone rubber), sulfur-containing rubber (for example, polysulfide rubber), fluoro rubber (for example, vinylidene fluoride rubber, fluorine-containing vinyl ether rubber, tetrafluoro ethylene-propylene rubber, fluorine-containing silicone rubber, fluorine-containing phosphazene rubber), thermoplastic elastomers (for example, styrene elastomer, olefin elastomer, polyester elastomer, urethane elastomer, polyamide elastomer) may be cited.

In a thermoplastic elastomeric composition, the composition ratio of a thermoplastic resin to an elastomer may be set as appropriate in consideration of the balance between the thickness and the flexibility of a sheet. The blending proportion of the thermoplastic resin may be not less than 10 weight percent, and preferably be 20 to 85 weight percent, based on the total weight of polymer components including the thermoplastic resin and the elastomer. Meanwhile, the blending proportion of the elastomer may be not less than 10 weight percent, and preferably be 10 to 80 weight percent, based on the total weight of the polymer components including the thermoplastic resin and the elastomer.

As the third component, another polymer, such as a compatibilizer, or a compounding agent may be mixed with the thermoplastic elastomeric composition, in addition to the thermoplastic resin component and the elastomeric component. The purpose of mixing another polymer is to improve the compatibility of the thermoplastic resin component and the elastomeric component, to enhance the processability and formability of the material into a film, to improve heat resistance of the tire, to reduce manufacturing costs, and the like. As a material used as a polymer for this purpose, for example, polyethylene, polypropylene, polystyrene, ABS, SBS, polycarbonate and the like can be cited.

The non-adhesive sheet 14 may be of a single layer, or may also be of plural layers including two or more layers. In addition, the thickness of the non-adhesive sheet 14 may be set in consideration of the structure, the rigidity, the amount of deformation, building conditions, and the like, of a green tire. The thickness may preferably be 0.04 mm to 2.0 mm, and more preferably be 0.06 mm to 1.5 mm. If the thickness is less than 0.04 mm, workability in attaching non-adhesive sheet 14 deteriorates. In particular, in the case of tires for passenger cars, it is preferable that the lower limit of the thickness be set at 0.05 mm, from the above viewpoint. On the other hand, if the thickness is more than 2.0 mm, the weight of a tire is pronouncedly increased.

The embodiment of the present invention has been described in detail above. However, it should be understood that various modifications, alterations and substitutions may be made on the present invention as long as not being departed from the spirit and scope of the present invention defined by the scope of the appended claims.

EXAMPLES

A pneumatic tire was obtained by using such a method of manufacturing a pneumatic tire as follows. In the method, a green tire is deformed by a building drum being expandable and contractable in the tire radial directions in the tire building process. First, a non-adhesive sheet was disposed on the innermost surface of a green tire. Then the green tire was formed with the non-adhesive sheet being attached thereto. Thereafter, the green tire was cured, and thereby a pneumatic tire was obtained (Examples 1 and 2.) In Example 1, as the non-adhesive sheet, a thermoplastic resin (polyester) was used. The thermoplastic resin used in Example 1 had a coefficient of friction of 0.2 on the building drum, and had a thickness of 0.1 mm. In Example 2, as the non-adhesive sheet, a thermoplastic elastomeric composition (obtained by blending Br-IIR with a nylon resin) was used. The thermoplastic elastomeric composition used in Example 2 had a coefficient of friction of 0.15 on the building drum, and had a thickness of 0.1 mm.

For comparative purpose, a pneumatic tire was manufactured in the same manner as those of Examples 1 and 2, except that a non-adhesive sheet was not attached to the innermost surface of a green tire (Conventional Example). In each of Conventional Example and Examples 1 and 2, an inner liner was provided to the inner side of a carcass layer of the green tire. The inner liner was composed of isobutylene-isoprene rubber, and had a thickness of 1 mm.

Fluctuation (maximum/minimum) in the end count (cords/50 mm) of carcass cords was detected in portions other than splice portions, of the carcass-layer of each tire obtained in the above-described manner. The result is shown in Table 1.

TABLE 1

|  |  | Conventional Example | Example 1 | Example 2 |
| --- | --- | --- | --- | --- |
| Inner Liner | Material | IIR | IIR | IIR |
|  | Thickness (mm) | 1 | 1 | 1 |
| Non-adhesive Sheet | Material | — | Thermoplastic Resin | Thermoplastic Elastomeric Composition |
|  | Thickness (mm) | — | 0.1 | 0.1 |
| Variation in end Count of Carcass Cords in Portions Other Than Splice Portions of Carcass Layer (maximum/minimum) |  | 1.15 | 1.10 | 1.05 |

As is clear from Table 1, according to the methods of manufacturing a pneumatic tire of Examples 1 and 2, the uniformity of a tire was improved, compared with Conventional Example.

What is claimed is:

1. A method of manufacturing a pneumatic tire, in which a green tire is deformed, in a tire building process, by a building drum being expandable and contractable in radial directions of the tire, the method characterized in that
    a non-adhesive sheet consisting of a thermoplastic elastomeric composition containing a blend of a thermoplastic resin and an elastomer formed by dispersing the elastomer into a matrix of the thermoplastic resin is disposed on the entirety of the innermost surface of the green tire, the non-adhesive sheet having a coefficient of friction of less than or equal to 0.2 on the building drum, and
    the green tire is built in a state where the non-adhesive sheet is attached thereto,
    the green tire includes a rubber sheet serving as an inner liner arranged inside a carcass layer, on a side closer to an internal cavity of the tire, the rubber sheet being formed from at least isobutylene-isoprene rubber, and
    the non-adhesive sheet is attached to the rubber sheet,
    wherein the thermoplastic elastomeric composition further comprises a compatibilizer polymer, and a thickness of the non-adhesive sheet is greater than 1.1 mm and less than or equal to 2.0 mm.

2. A method of manufacturing a pneumatic tire, in which a carcass layer and an inner liner are deformed, in a tire building process, by a building drum being expandable and contractable in radial directions of the tire, the method characterized in that
    a non-adhesive sheet consisting of a thermoplastic elastomeric composition containing a blend of a thermoplastic resin and an elastomer formed by dispersing the elastomer into a matrix of the thermoplastic resin is disposed on the entirety of the innermost surface of the tire, the non-adhesive sheet having a coefficient of friction of less than or equal to 0.2 on the building drum, and
    the tire is built in a state where the non-adhesive sheet is attached thereto,
    the tire includes a rubber sheet serving as the inner liner arranged inside the carcass layer, on a side closer to an internal cavity of the tire, the rubber sheet being formed from at least isobutylene-isoprene rubber, and
    the non-adhesive sheet is attached to the rubber sheet,
    wherein the thermoplastic elastomeric composition further comprises a compatibilizer polymer, and a thickness of the non-adhesive sheet is greater than 1.1 mm and less than or equal to 2.0 mm.

* * * * *